POWER LINE COMMUNICATION SYSTEMS

Filed April 28, 1966

INVENTOR.
RUDOLF AUSFELD
BY
Morgan, Finnegan, Durham & Pine
ATTORNEYS.

United States Patent Office 3,483,546
Patented Dec. 9, 1969

3,483,546

POWER LINE COMMUNICATION SYSTEMS

Rudolf Arthur Ausfeld, Pfaffenhausen, Zurich, Switzerland, assignor to Landis & Gyr, A.G., Zug, Switzerland, a corporation of Switzerland Filed Apr. 28, 1966, Ser. No. 546,019
Claims priority, application Switzerland, May 24, 1965, 7,249/65
Int. Cl. H04m *11/04;* G06g *7/19;* G06f *15/34*
U.S. Cl. 340—310 12 Claims

ABSTRACT OF THE DISCLOSURE

A power line distribution network communication system wherein the transmitted signal is synchronized with the network frequency and wherein the receiver is of the correlation type synchronized to the network frequency.

This invention relates to power line communication systems of the type including a transmitter and one or more receivers coupled through an electrical power distribution network.

The advantages associated with power line communication systems are considerable, and as a result, their use has been steadily increasing, particularly for accomplishing numerous control functions within the distribution network. Power line communication systems are also ideal for transmission of alarm signals such as for air raid protection, fire fighting, police, etc.

These communication systems must be designed to provide the control or alarm functions quickly and reliably. However, if short transmission times are to be achieved, it is usually necessary to have a high signal level in order to obtain the desired reliability. The high signal level, however, increases the cost of the transmission equipment and creates other problems within the distribution network. If on the other hand the system has a short transmission time and a low signal level, more sensitive receiving equipment is required, and hence, this approach is even less desirable because of the increased cost of the large number of receivers usually included in the system. Accordingly, the prior systems do not provide satisfactory reliable high speed operation since they either require considerable transmission power or expensive receivers.

An object of this invention is to provide improved power line communication equipment eliminating the difficulties experienced with prior systems.

Another object of the invention is to provide a relatively high speed power line communication system operating at a low signal level with relatively inexpensive transmitter and receiving equipment.

In the system in accordance with this invention the correlation technique is used to provide low signal level communication within an extremely narrow bandwidth and to provide receivers with an enhanced selectivity. The transmitter is coupled to the distribution network and provides at least one fixed audio frequency signal which is synchronized with the network frequency. The receivers are likewise synchronized with the network frequency and utilize correlation techniques to detect the audio signal.

The foregoing and other objects will become apparent from the following detailed description in which several illustrative embodiments are described. The drawings form part of the specification wherein.

Figures 1, 2, 2A, 3:
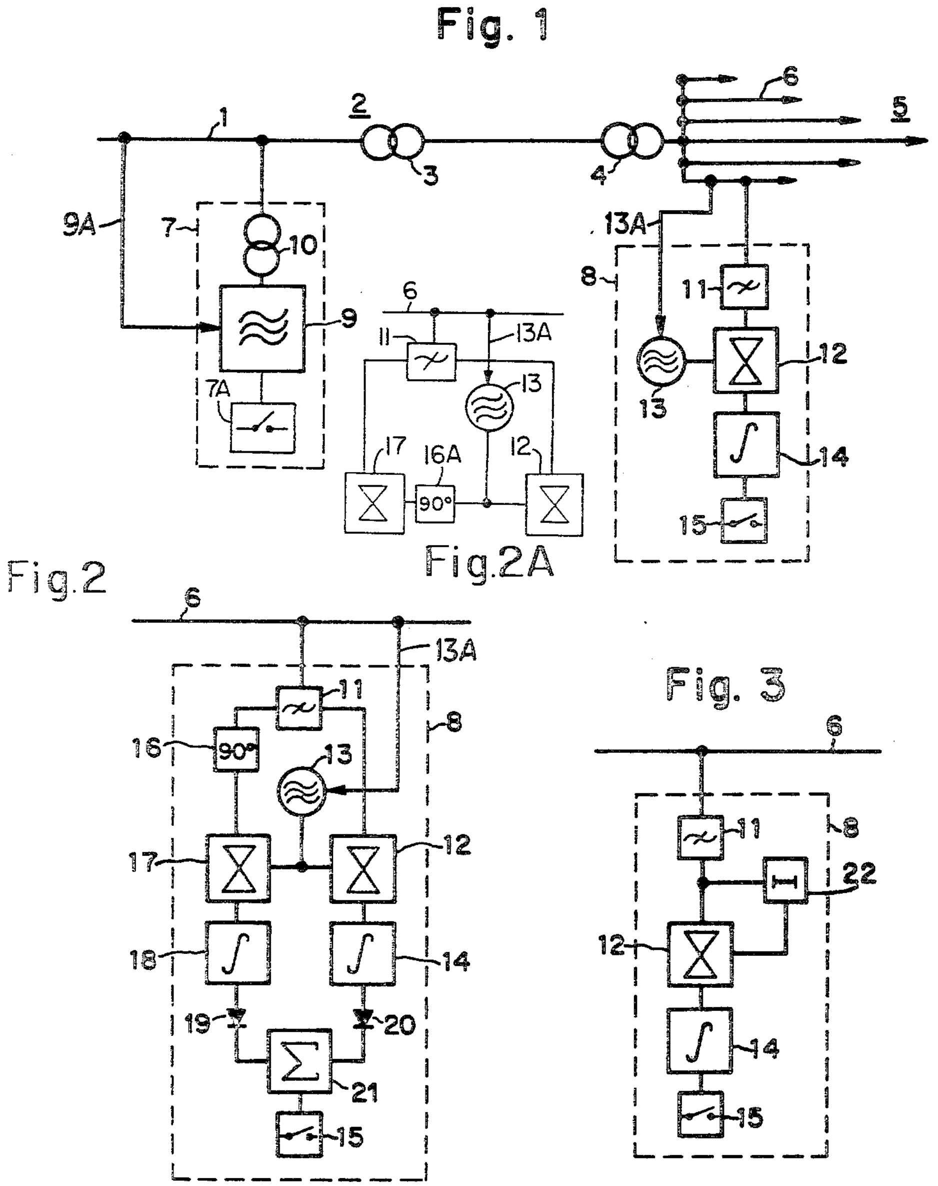
FIGURE 1 is a block diagram illustrating a transmitter and receiver coupled to the power line distribution network.
FIGURE 2 is a block diagram illustrating an alternative receiver that is relatively phase insensitive.
FIGURE 3 is a block diagram illustrating a receiver constructed in accordance with auto-correlation techniques.

In FIGURE 1 a distribution network 2 is shown schematically including an input power line 1 which may be a high voltage 50 cycle polyphase line. Line 1 is coupled to a low voltage local distribution network 5 including a power line 6 via transformers 3 and 4. The power line communication system includes a transmitter 7 coupled to power line 1, and a receiver 8 coupled to one of the power lines 6 in the local distribution network. In a typical installation for achieving network control functions there will be one or more transmitters located at the generating station and a large number of receivers distributed throughout the remainder of the system. However, the number of transmitters and receivers as well as their location depends upon the particular requirements of the system.

Transmitter 7 includes an audio frequency signal generator 9 coupled to power line 1 via a suitable coupling member or transformer 10. The signal generator receives a synchronizing signal from the power line via conductor 9A, and provides an audio frequency output signal that is a multiple of the network frequency. Thus the audio frequency signal provided by signal generator 9 has a fixed frequency and phase relationship to the network frequency and tends to follow the slight fluctuations in network frequency. Signal generator 9 can be a synchronous rotary frequency changer or a synchronous audio oscillator. A suitable switching circuit 7A is included in the transmitter to control the audio output signal in on-off phase as is desired for signal transmission.

Receiver 8 is a highly frequency selective unit constructed on the cross-correlation principle. The primary component in the receiver is a multiplier circuit 12. One input signal for the multiplier is the received audio frequency signal which is coupled to one input terminal of multiplier circuit 12 via a bandpass filter 11. The other input signal for the multiplier is a reference signal provided by a signal generator 13 which operates with respect to a synchronizing signal received from the distribution network via a conductor 13A. Signal generator 13 in the receiver is essentially the same as signal generator 9 in the transmitter. Signal generators 9 and 13 are both synchronized from the distribution network and therefore provide output signals of the same frequency with a fixed phase relationship. Both signal generators follow the frequency fluctuations of the distribution network. Also, since the received signal supplied to the multiplier circuit via filter 11 is derived from signal generator 9, this input signal will be of the same frequency and have a fixed phase relationship with respect to that generated by signal generator 13.

When an audio signal is multipled with another audio signal of the same frequency, the resultant is a sine wave that is positive throughout the entire cycle if the multiplied signals are in phase or negative throughout the entire cycle if the multiplied signals are 180° out of phase.

The output from multiplier circuit 12 is coupled via an integrator 14 to a switching circuit 15 having a predetermined threshold voltage. The integrator cumulates the unidirectional component of the multiplier output signal and, when sufficient voltage is attained, activates the switching circuit to carry out the desired switching function. Thus, if signal generators 9 and 13 are in phase, multiplier 12 provides a signal having a positive DC component and therefore integrator 14 provides an output signal to the switching circuit which becomes increasingly positive during the signal transmission. Under these circumstances switching circuit 15 is designed for response to a positive threshold voltage. If on the other hand, the signal generators 9 and 13 are 180° out of phase, multiplier circuit 12 provides an output signal with a negative DC component and the output signal of the integrator therefore becomes increasingly negative during the transmission. Switching circuit 15 would therefore be designed having a negative threshold voltage. In some installations it may be desirable to use a polarity responsive switching circuit responsive both to positive and negative threshold levels so that the phase relation can be used as an element of the transmitted information.

Figure 1A:
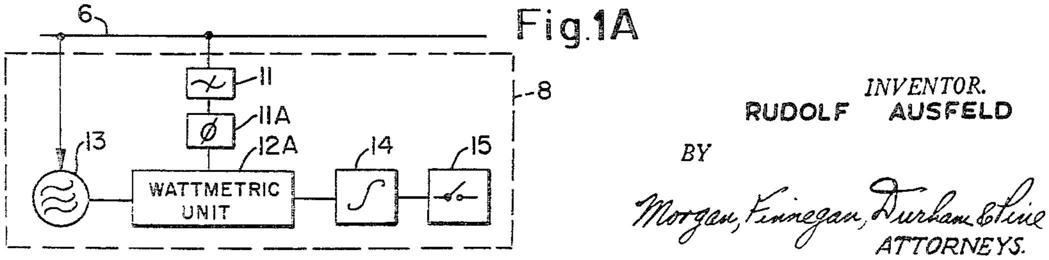

Suitable multiplier and integrator circuits for the receivers can be found in any analog computer handbook. In some cases it may be desirable to insert a phase correction unit 11A, as shown in FIGURE 1A, between filter circuit 11 and the multiplier circuit to compensate for phase displacements due to changes in transmission properties. A simple synchronous rotating unit will provide adequate correction in most cases.

In portions of the network where there is considerable fluctuation in the transmission properties and corresponding changes in the phase relationships of the transmitted and received signals, it may be advantageous to construct the receiver as shown in FIGURE 2. One channel within this receiver includes filter circuit 11, multiplier circuit 12, integrator circuit 14 and signal generator 13 which operate as previously described in FIGURE 1. A second channel includes a phase shift circuit 16 connected between filter 11 and one input of a multiplier circuit 17, the phase shift circuit being constructed to provide a 90° phase shift. Multiplier circuits 12 and 17 operate in a quadrature relationship and are of similar construction both receiving their reference signals from signal generator 13. The output of multiplier circuit 17 is supplied to an integrator 18 which is similar to integrator 14. The positive components of the integrator outputs pass through diodes 19 and 20 to a summing circuit 21 which in turn is connected to a threshold responsive switching circuit 15.

The receiver operates largely independent of phase displacements since at least one of the channels will provide a positive component in the output signal over a considerable range of phase displacements. The same effect can be achieved by inserting a phase shifting circuit 16A, as shown in FIGURE 2A, between signal generator 13 and multiplier circuit 17 instead of between the filter circuit and the multiplier circuit.

Where the noise in the vicinity of the receiver is not of a regular or periodic nature, an auto-correlation receiver such as shown in FIGURE 3 can be utilized effectively. This receiver likewise includes a filter circuit 11, a correlator 12, an integrator 14 and a switching circuit 15 interconnected essentially the same as previously described. The reference signal for the multiplier instead of being supplied from a signal generator, is produced by means of a time delay circuit 22 coupled between filter circuit 11 and one of the multiplier inputs. The shifted signal from time delay circuit 22 is superimposed upon the non-shifted signal coming directly from filter circuit 11. A DC component is provided at the output of correlator 12 and is cumulated by the integrator when the frequency of the received audio signal has a cyclical period corresponding to that of time delay circuit 22.

A very simple and inexpensive receiver can be constructed using standard elements to perform the functions illustrated in the drawings. For example, a unit similar to a Ferraris power unit or electro-mechanical wattmetric unit 12A (FIGURE 1A) such as a watthour meter will provide the multiplier and integrator functions. One coil of the watthour meter would receive the audio signal from the distribution network and the other coil would receive the reference signal generated by simple rotary frequency converter. The shaft rotation would then correspond to the integrated product of the two input signals and can be used to operate the output switching circuit.

The power line communication system in accordance with the invention achieves transmission speeds not significantly inferior to those achieved with prior known high speed systems. The signal level, however, can be reduced by a factor of one hundred and thereby makes possible simpler and less expensive transmitters that can easily be synchronized with the network frequency. The low signal level also makes possible the simultaneous use of a plurality of transmitters in different positions within the transmission network without reaching disturbingly high signal levels.

A single-frequency synchronized system has the added advantages of multiple communication achieved by the simple expedient of phase control. Furthermore, because of the high degree of selectivity at the receiver, multi-frequency systems including a large number of communication channels can be designed to operate within a fairly limited frequency bandwidth. When non-synchronous systems are permissible, further reductions in receiver costs can be achieved.

What is claimed is:

1. In a communication system coupled through a power line distribution network, the combination of
- a transmitter coupled to the distribution network to super-impose upon the network power lines an audio frequency signal having a fixed frequency relationship to the network frequency;
- at least one correlation receiver coupled to the distribution network including
  - a multiplier having two input terminals
  - first circuit means connected between the distribution network and one terminal of said multiplier to couple the received signal to one of said input terminals,
  - second circuit means connected to the other of said input terminals to provide a reference signal having the same frequency as provided by said transmitter, and
  - output circuit means connected to said multiplier and responsive to the product of said received signal and said reference signal.

2. A communication system in accordance with claim 1 wherein said second circuit means includes a signal generator synchronized from the network frequency.

3. A communication system in accordance with claim 1 wherein said second circuit means includes a time delay circuit responsive to said received signal.

4. A communication system in accordance with claim 1 wherein said output circuit means includes an integrator for cumulating unidirectional components of said product and a switching circuit responsive to the cumulated integrator output.

5. A communication system in accordance with claim 4 wherein said multiplier and said integrator is a part of an electro-mechanical wattmetric unit.

6. A communication system in accordance with claim 4 wherein said switching circuit is polarity responsive.

7. A communication system in accordance with claim 1 wherein said first circuit means includes a bandpass filter and a phase corrector is connected between said filter and said multiplier.

8. In a communication system coupled through a power line distribution network, the combination of
- a transmitter coupled to the distribution network to super-impose upon the network power lines an audio frequency signal having a fixed frequency relationship to the network frequency;
- at least one correlation receiver coupled to the distribution network including
  - a pair of multipliers operating in quadrature relationship and each having two input terminals,
  - first circuit means connected between the distribution network and one input terminal of each of said multipliers to couple the received signal thereto, second circuit means connected between the distribution network and the other terminals of said multipliers to provide reference signals thereto having the same frequency as provided by said transmitter, and output circuit means connected to said multipliers and responsive to the sum of the multiplier products.

9. A communication system in accordance with claim 8 wherein said first circuit means includes a phase-shifter connected therein to shift the phase of the received signal applied to one of said multipliers by approximately 90°.

10. A communication system in accordance with claim 8 wherein said second circuit means includes a phase-shifter connected therein to shift the phase of the reference signal supplied to one of said multipliers by approximately 90°.

11. In an audio-frequency communication system coupled through a power line distribution network, the combination of a transmitter coupled to the distribution network to superimpose upon the network power lines an audio-frequency signal having a fixed frequency relationship to the network frequency; and a receiver coupled to the distribution network to derive a received audio-frequency signal, said receiver including means for producing a reference signal at the receiver synchronized to the network frequency, and correlation means responsive to said received signal and said reference signal to produce an output signal resulting from correlation of said reference and received signals.

12. A communication system according to claim 11 wherein said correlation means includes a multiplier for producing the product of said received signal and said reference signal and wherein an integrator is connected to said multiplier responsive to said product.

References Cited

UNITED STATES PATENTS

| | | | |
|---|---|---|---|
| 1,989,509 | 1/1935 | Fitzgerald | 340—310 |
| 2,312,127 | 2/1943 | Shepard | 340—310 |
| 2,840,308 | 6/1958 | Van Horne | 235—181 |
| 2,896,162 | 7/1959 | Berger et al. | 235—181 X |
| 3,202,765 | 8/1965 | Byrne | 325—49 |
| 3,337,870 | 8/1967 | Allen et al. | |

JOHN W. CALDWELL, Primary Examiner

M. SLOBASKY, Assistant Examiner

U.S. Cl. X.R.

235—181; 325—63, 65